(12) United States Patent
Danilov et al.

(10) Patent No.: US 11,093,386 B2
(45) Date of Patent: Aug. 17, 2021

(54) CONSOLIDATING GARBAGE COLLECTOR IN A DATA STORAGE SYSTEM

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 28 days.

(21) Appl. No.: 16/718,776

(22) Filed: Dec. 18, 2019

(65) Prior Publication Data

US 2021/0191856 A1 Jun. 24, 2021

(51) Int. Cl.
*G06F 3/06* (2006.01)
*G06F 12/02* (2006.01)

(52) U.S. Cl.
CPC ................. *G06F 12/0253* (2013.01)

(58) Field of Classification Search
CPC ......... G06F 2212/7205; G06F 12/0253; G06F 2212/1044; G06F 12/0261; G06F 3/0608; G06F 16/2329; G06F 2212/1016; G06F 12/0246; G06F 3/064; G06F 3/0647
USPC ....................................................... 711/156
See application file for complete search history.

(56) References Cited

U.S. PATENT DOCUMENTS

| 2007/0294499 A1* | 12/2007 | Garthwaite | G06F 12/0253 |
| | | | 711/170 |
| 2010/0082930 A1* | 4/2010 | Jiva | G06F 12/0269 |
| | | | 711/166 |
| 2017/0199675 A1* | 7/2017 | Subramanian | G06F 3/0652 |
| 2017/0220623 A1* | 8/2017 | Blount | G06F 16/24578 |
| 2018/0181487 A1* | 6/2018 | Danilov | G06F 16/2246 |

* cited by examiner

*Primary Examiner* — Hashem Farrokh
(74) *Attorney, Agent, or Firm* — Amin, Turocy & Watson, LLP

(57) ABSTRACT

The technology described herein is directed towards consolidating garbage collection of data stored in data structures such as chunks, to facilitate efficient garbage collection. Low capacity utilization chunks are detected as source chunks, and live data of an object (e.g., in segments) is copied from the source chunks to new destination chunk(s). A source chunk is deleted when it no longer contains live data. By copying the data on an object-determined basis, new chunks contain more coherent object data, which increases the possibility of future chunk deletion without data copying or with a reduced amount of copying. When data segments of an object are adjacent, the consolidating garbage collector may unite them into a united segment, which reduces an amount of system metadata per object. New chunks can be associated with a generation number (e.g., indicating the oldest previous generation) to further facilitate more efficient future chunk deletion.

20 Claims, 11 Drawing Sheets

CONSOLIDATING GARBAGE COLLECTOR IN A DATA STORAGE SYSTEM

TECHNICAL FIELD

The subject application generally relates to data storage, and, for example, to a data storage system that reclaims storage capacity by copying related segments of live object data from existing low-capacity (underloaded) chunks into new chunks, and deleting the underloaded chunks, and related embodiments.

BACKGROUND

Contemporary cloud-based data storage systems, such as ECS (formerly known as ELASTIC CLOUD STORAGE) provided by DELL EMC, store data in a way that ensures data protection while retaining storage efficiency. In ECS, object data is stored in storage units referred to as chunks, with one chunk typically storing the object data of multiple objects. When storage clients delete data, sections of dead storage space result within a chunk. To reclaim this storage space ECS implements a copying garbage collection in which the data from two or more low-capacity (underloaded) chunks are copied to one or more new chunk in a way that assures higher capacity utilization, after which the underloaded chunks are deleted to reclaim their capacity.

While this works reasonably well, copying garbage collection can be relatively inefficient because the copied data in the new chunks eventually itself gets deleted, often at different times, resulting in further garbage collection operations. To improve efficiency, generational garbage collection has been implemented, in which a generational garbage collector segregates user data by age into multiple areas (sets of chunks), on the basis that that areas containing older objects, which tend to be long-living objects, need garbage collection less often. However, the remaining lifetime of those long-living objects may differ significantly, again resulting in deletion of copied object data at different times. For example, one object may be close to the end of its life, while another object may be at the beginning of its extended life. Thus, even with generational garbage collection, additional data copying cycles may be needed for older generation chunks, which is again relatively inefficient.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards a consolidating garbage collector that operates in part by identifying the live segments of objects that are in source chunks with low capacity utilization, that is, including the live segments of objects that are in garbage collection candidate chunks, and optionally additional source chunks. For any such object, the related segments of that object are moved to storage in a single chunk (if the segments fit), or into a sequence of chunks (if the segments are too large for a single chunk). By analyzing the objects that have data in one or multiple candidate chunks, and moving object segments into the same chunk (or sequence of chunks), the consolidating garbage collector is object aware, which reduces the variety of data within a chunk/assures higher coherence of data within a chunk.

In one aspect, the consolidating garbage collector stores the segments of an object to contiguous destination storage (e.g., chunk) space; note that contiguous destination storage space, for example, refers to storage space within at least one chunk, and possibly to two or more chunks for the same object's data segments. When two or more of an object's data segments are adjacent within a chunk, the consolidating garbage collector may store them in their natural order, and then operate on the object's metadata to unite the two or more data segments into one greater segment. As a result, data consolidation as described herein also can reduce the amount of system metadata per user object.

As will be understood, the implementation(s) described herein are non-limiting examples, and variations to the technology can be implemented. For example, in ECS cloud storage technology a "chunk" is a data storage unit/structure in which data objects are stored together, garbage collected and so on; however any data storage unit/structure can be used, such as the data structures to maintain data in other data storage systems. Indeed, it should be understood that any of the examples herein are non-limiting. For instance, some of the examples are based on ECS cloud storage technology; however virtually any storage system may benefit from the technology described herein. Thus, any of the embodiments, aspects, concepts, structures, functionalities or examples described herein are non-limiting, and the technology may be used in various ways that provide benefits and advantages in computing and data storage in general.

Figure 1:
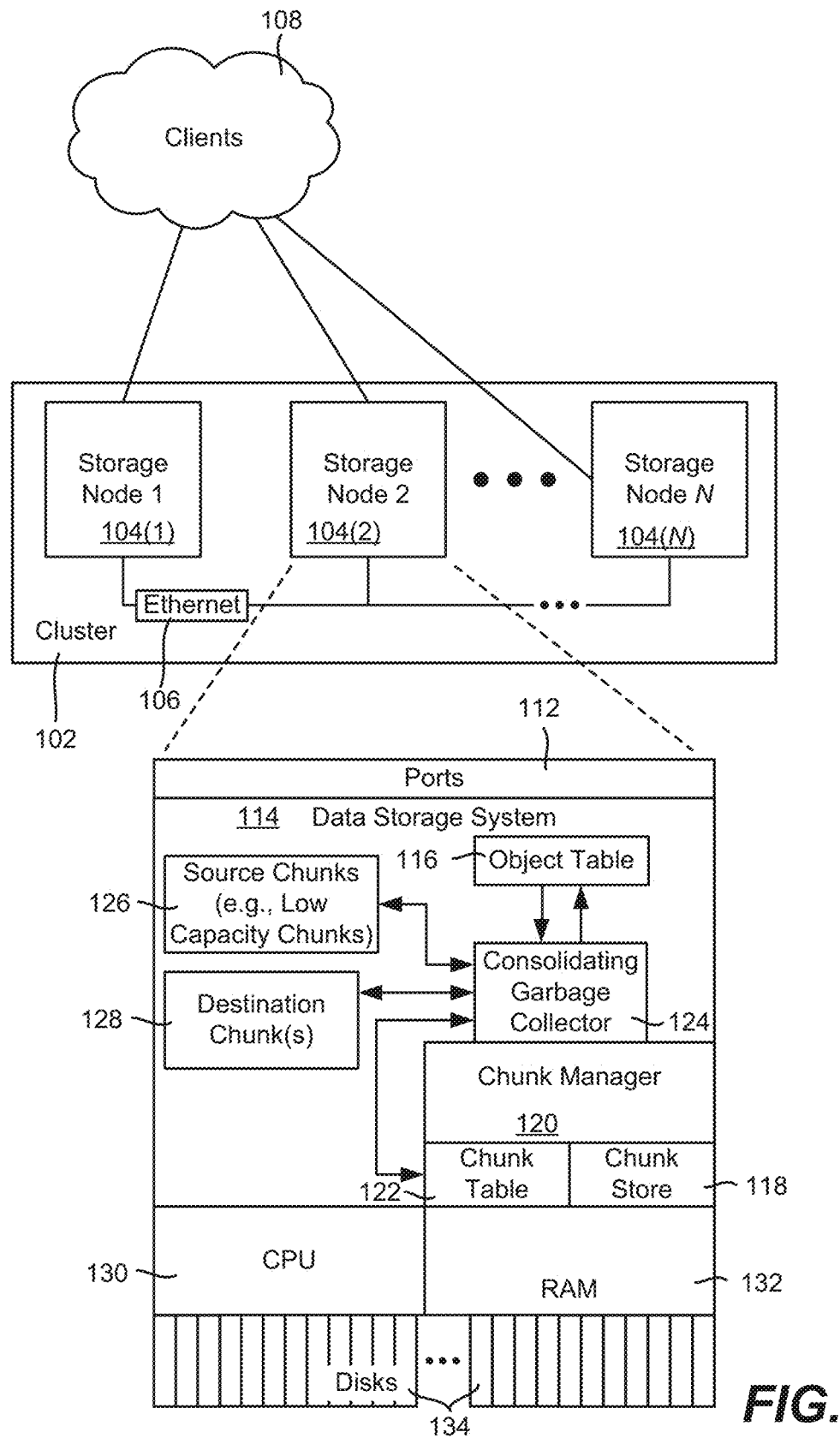
FIG. 1 is an example block diagram representation of part of a data storage system including nodes, in which a consolidating garbage collector moves object segments to new destination chunks, according to one or more example implementations.

FIG. 1 shows part of a cloud data storage system such as ECS comprising a zone (e.g., cluster) 102 of storage nodes 104(1)-104(N), in which each node is typically a server configured primarily to serve objects in response to client requests. The nodes 104(1)-104(N) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

In general, and in one or more implementations, e.g., ECS, disk space is partitioned into a set of relatively large blocks of typically fixed size (e.g., 128 MB) referred to as chunks; user data is generally stored in chunks, e.g., in a user data repository. Normally, one chunk contains segments of several user objects. In other words, chunks can be shared, that is, one chunk may contain segments of multiple user objects; e.g., one chunk may contain mixed segments of some number of (e.g., three) user objects.

Each node, such as the node 104(2), includes an instance of a data storage system 114 and data services; (note however that at least some data service components can be per-cluster, or per group of nodes, rather than per-node). For example, ECS runs a set of storage services, which together implement storage business logic. Services can maintain directory tables for keeping their metadata, which can be implemented as search trees. A blob service can maintain an object table 116 that keeps track of objects in the data storage system 114 and generally stores the system objects' metadata, including an object's data location within a chunk. Note that the object table 116 can be partitioned among the nodes 104(1)-104(N) of the cluster. There is also a "reverse" directory table (maintained by another service) that keeps a per chunk list of objects that have their data in a particular chunk.

FIG. 1 generalizes some of the above concepts, in that the user data repository of chunks is shown as a chunk store 118, managed by a chunk manager 120. A chunk table 122 maintains metadata about chunks, optionally including generation numbers as described herein, e.g., as one of a chunk's attributes.

Further, as described herein, a consolidating garbage collector 124 is coupled to the chunk table 122 and the chunk manager 120 to determine garbage collection candidates (low capacity utilization chunks). These low capacity utilization chunks become source chunks 126 for consolidating object segments. The consolidating garbage collector 124 accesses the object table 116 to determine segments of objects in the source chunks 126, for moving into destination chunk(s) 128.

Note other chunks may be added to the set of source chunks, to expand the set of source chunks. By way of example of expanding the set of source chunks, consider that low capacity utilization chunks are those which have less than eighty percent utilization, and thus are garbage collection candidate chunks that are part of the set (group) of source chunks as described herein. However, when determining the segments of an object to copy to a new chunk, the group of source chunks optionally may be expanded to include those having some other capacity utilization threshold (e.g., ninety percent of the garbage collection candidate threshold, e.g., below seventy-two percent utilization). By expanding the set of source chunks, for example, the segments of a given object to be consolidated as described herein often will be less distributed throughout the data storage system, and possibly entirely moved into the new chunk(s).

In FIG. 1, a CPU 130 and RAM 132 are shown; note that the RAM 132 may comprise at least some non-volatile RAM. The node includes storage devices such as disks 134, comprising hard disk drives and/or solid-state drives. As is understood, any node data structure such as an object, object table, chunk table, chunk, code, and the like can be in RAM 128, on disk(s) 130 or a combination of partially in RAM, partially on disk, backed on disk, replicated to other nodes and so on. For example, the garbage collector can be loaded at least partially in RAM 132, and can operate on underloaded chunks 126 and write them to the destination chunk(s) 128 at least partially in RAM 132.

Figure 2:
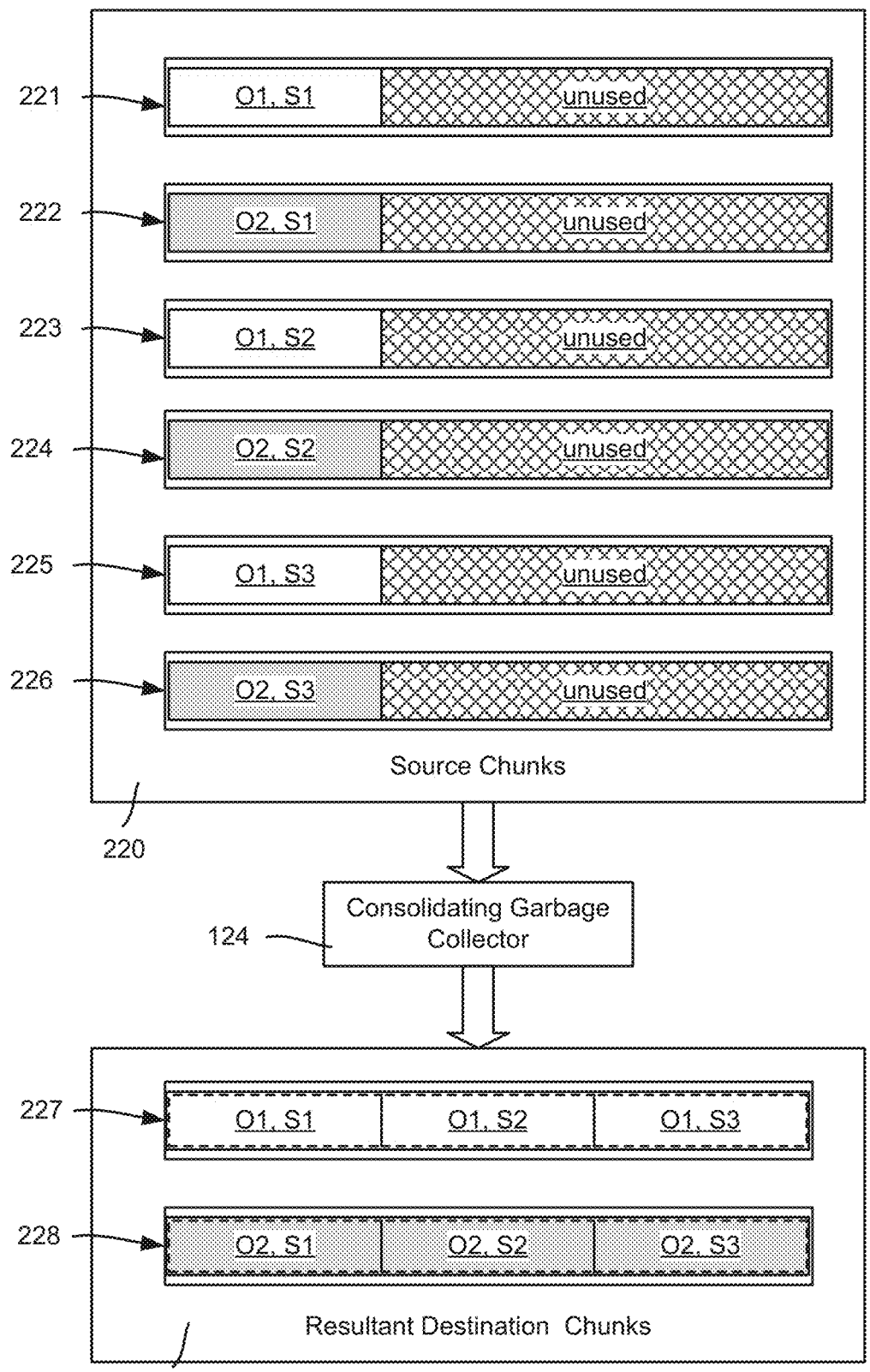
FIG. 2 is a representation of example chunks containing objects' segments being moved into resultant destination chunks, according to one or more example implementations.

FIG. 2 shows a set of source chunks 220, which in this example comprise low capacity utilization ("underloaded") chunks 221-236. More particularly, over time objects get deleted, resulting in unused space within chunks, which can become low capacity utilization ("underloaded") chunks 221-226. A threshold capacity utilization evaluation can be used; e.g., when less than eighty percent of a chunk contains object data that is no longer utilized, the chunk becomes a garbage collection candidate. Further, as described herein, a chunk can become a source chunk 220 for moving an object's segments therefrom at a different threshold capacity utilization level, e.g., ninety percent of the garbage collection candidate threshold, which in the above example is eighty percent times ninety percent, equaling seventy-two percent.

The consolidating garbage collector operates on the source chunks 220 based on segments of an object, such as on a per-object basis; the segments are shown as object number, segment number; six such object segments (O1, S1) through (O2, S3) are shown in FIG. 2. Note that while the exemplified object data segments represented as being generally the same size, this is only for purposes of illustration, and in actual implementations, any number of objects' data segments of any size can be within a given chunk in which the data segments fit. Further note that based on the way data creation is typically organized, the probability of having object segments in multiple data chunks is relatively high.

As can be seen, in FIG. 2 the resultant destination chunks 229 contain two chunks 227 and 228, and each chunk has the data segments of one of the objects. That is, upon copying the chunk 227 contains data segments of object 1, namely {O1, S1; O1, S2; O1, S3}, and the chunk 228 contains data segments of object 2, namely {O2, S1; O2, S2; O2, S3}. The copied data segments that were in the source chunks are then considered unused, and each of the source chunks 221-226 can be deleted when that source chunk is entirely unused, having had has its live data copied therefrom and thus no longer containing any live data. Further, although not shown in FIG. 2, after copying the segments in the new chunks 227 and 228 can be united into larger data segments as described herein with reference to FIG. 4.

As can be readily appreciated, if at any time object 1 is deleted by a user, because object 1 occupies the chunk 227 with no other object data therein, the storage space of the chunk 227 can be reclaimed without any copying of data; this is highly efficient as avoiding copying is advantageous with respect to saving computing resources. Similarly, this is the situation for object 2 and the chunk 228. Note that even if another object had data stored in one of the chunks 227 or 228, such that the space cannot be reclaimed without some data copying, the technology described herein reduces the quantity of copying cycles and/or total amount of copying required.

Note that consolidation on a per-object basis is in contrast to copying and the generational garbage collectors that operate with "faceless" data segments, meaning that they have no concept of an object's identity when moving the data segments. Instead, copying and generational garbage collectors map whatever data segments are available in the candidate chunks to new chunks (although the generational garbage collector maps based data segments on generational "age"). For example, if moving segments in the order shown in FIG. 2 with a copying or generational garbage collector (assuming the same generation), a new chunk A would contain the segments of both object 1 and object 2, namely {O1, S1; O2, S1; O1, S2}, and a new chunk B would contain the segments of both object 1 and object 2, namely {O2, S2; O1, S3; O2, S3}. A result, when the copying has been completed with a copying or generational garbage collector, the new chunks would contain mixed data segments of the two objects.

Figure 3:
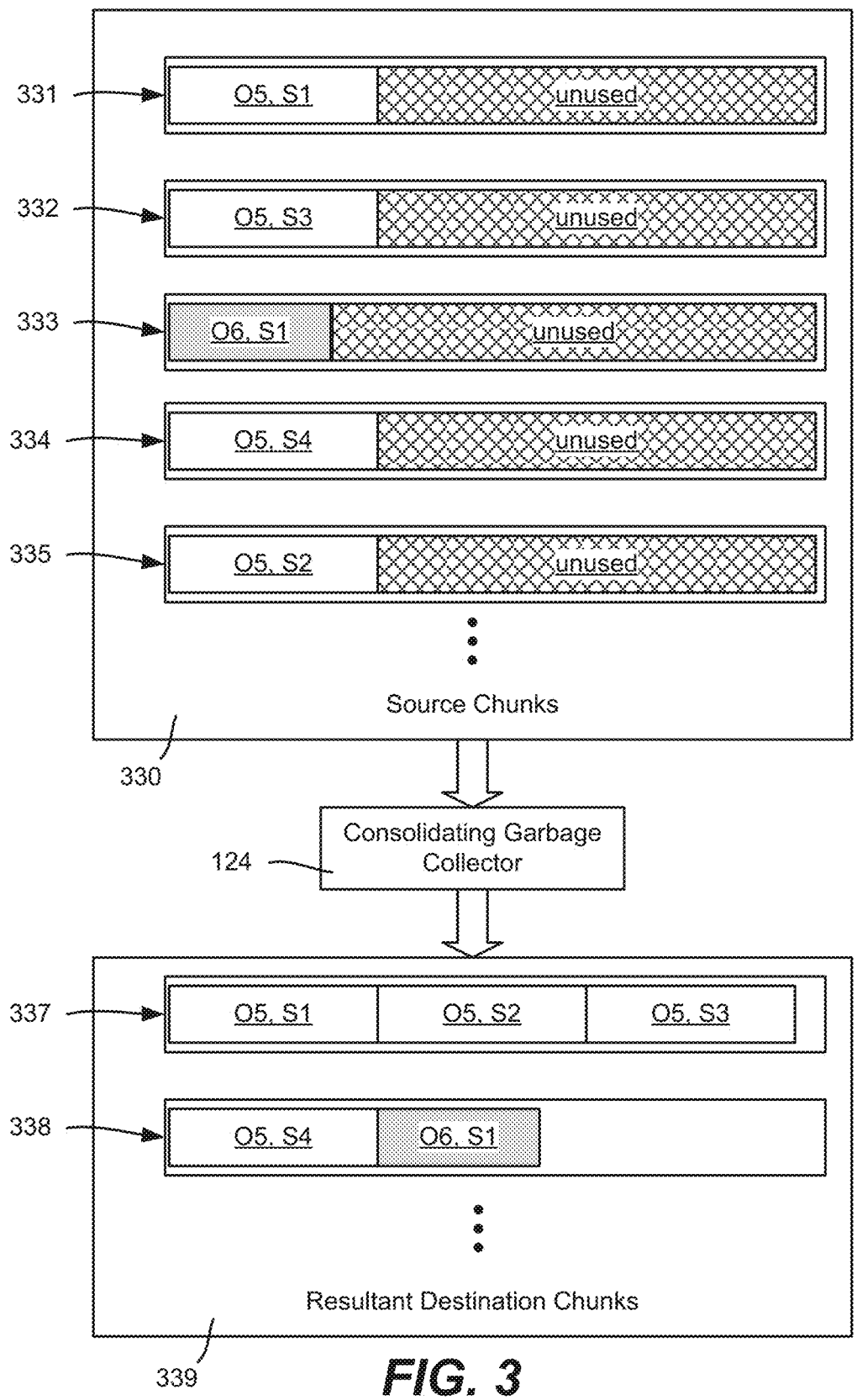
FIG. 3 is a representation of example chunks containing an object's segments being moved into multiple destination chunks, according to one or more example implementations.

FIG. 3 shows the concept of having multiple (two in this example) destination chunks 339 for an object's data segments. In the example of FIG. 3, a set of source chunks 330 contains some number of (five are shown) source chunks 331-335, corresponding to object data segments O5, S1; O5, S3; O6, S1; O5, S4 O5, S2. The consolidating garbage collector 124 moves object 5's data segments O5, S1; O5, S2; O5, S3 into the resultant destination chunk 337. Because object 5's data segment O5, S4 does not fit into the chunk 337, the consolidating garbage collector 124 uses another new destination chunk 338 for storing the data segment O5, S4. Note that in this example, the consolidating garbage collector 124 also moves object 6's data segment O6, S1 into the chunk 338, for example because there are no other object 6 data segments to move and object 6's sole data segment O6, S1 fits into the remaining storage space of the destination chunk 338. The remaining space of the chunk 338 can be used for other object data, such as data of other multiple small objects, or a data segment of another object like the object O5 that needs to be copied to more than one chunk.

Note that there can be a mapping between source chunks and destination (new) chunks, by which the live data in a first chunk is expected to end up in a predefined second chunk. More particularly, (as with other copying-type garbage collectors), the consolidating garbage collector 124 can build a mapping in advance or as needed. By way of example, consider that there are three garbage collection candidates, sources A, B, and C, with capacity utilization of 66 percent. The consolidating garbage collector 124 sums up the utilizations (198 percent) and determines that two new chunks, destination chunks D and E, are sufficient to accommodate the live data from these source chunks. The consolidating garbage collector 124 can thus create a mapping between the source and the destination chunks such that the data from A, B, and C are to be copied to D and E. The mapping can be such that no data from A, B, or C is to be copied to other than new chunks D and E, and further that no data from other garbage collection candidate chunks are to go to D and E. The consolidating garbage collector 124 initially may act as a conventional copying garbage collector with respect to mapping, with modifications for consolidation opportunities with respect to an object's data segments, e.g., by adding or removing chunks from the set of source chunks or the set of destination chunks.

Alternatively, or possibly in addition to some mapping operations, the consolidating garbage collector 124 may discard (at least part of) the mapping and start "streaming" live data to a "stream" of new destination chunks. Such new streamed destination chunks can be created (allocated) on demand, as needed.

Figure 4:
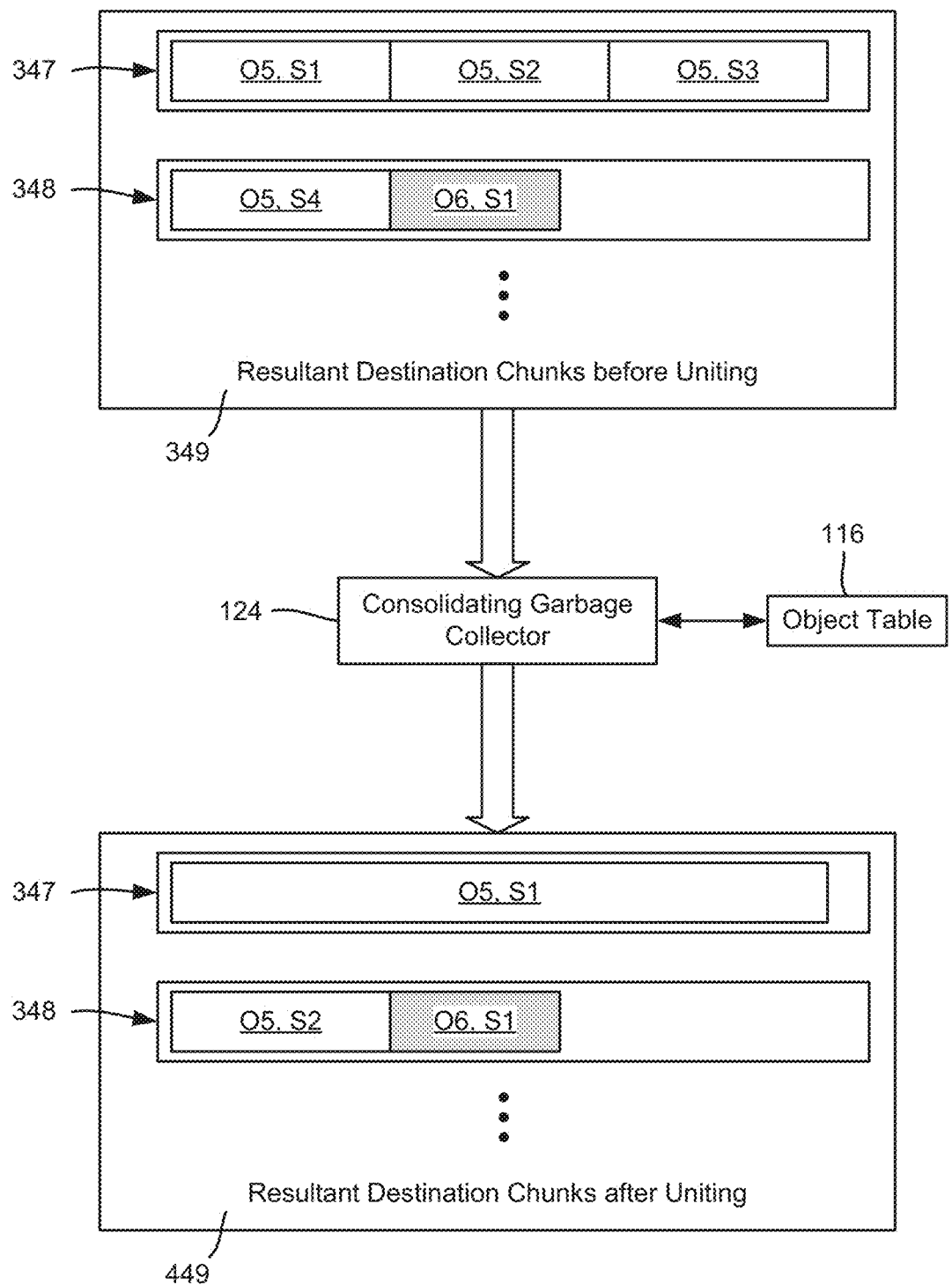
FIG. 4 is a representation of example object segments in resultant new chunks being united into a lesser number of object segments, according to one or more example implementations.

FIG. 4 shows the concept of consolidating data segments in a chunk where possible. In FIG. 4, the chunk 347 contains three adjacent data segments S1-S3 of the same object O5. Note that the consolidating garbage collector 124 can copy the object's data segments intentionally in this order into the "destination chunk 347 in the "before" uniting destination chunks 349. By manipulating object table metadata, (e.g., including changing the size of the data segment S1 and removing the references and chunk offsets to data segments 2 and 3), the data segments can be united into a single segment O5, S1 as shown in the chunk 347 in the "after" uniting destination chunks 449. Note that the chunk 348 can be considered as having the next data segment (e.g., in FIG. 4 the data segment S6 gets renumbered to S2 in the "after" uniting destination chunks 449), which in this example indicates that O5, S2 in the chunk 348 follows the data segment O5, S1 in the chunk 347.

FIG. 4 also shows that a destination chunk can remain open for copying other object data segment(s) thereto, in this example the data segment S1 of object 6. Whether a destination chunk remains open can be based on a threshold evaluation. For example, if utilization of a destination chunk is below the threshold capacity, the chunk is left open so that the chunk can later store other data. Otherwise, a destination chunk above the threshold capacity is sealed with respect to any new data writes.

Figure 5:
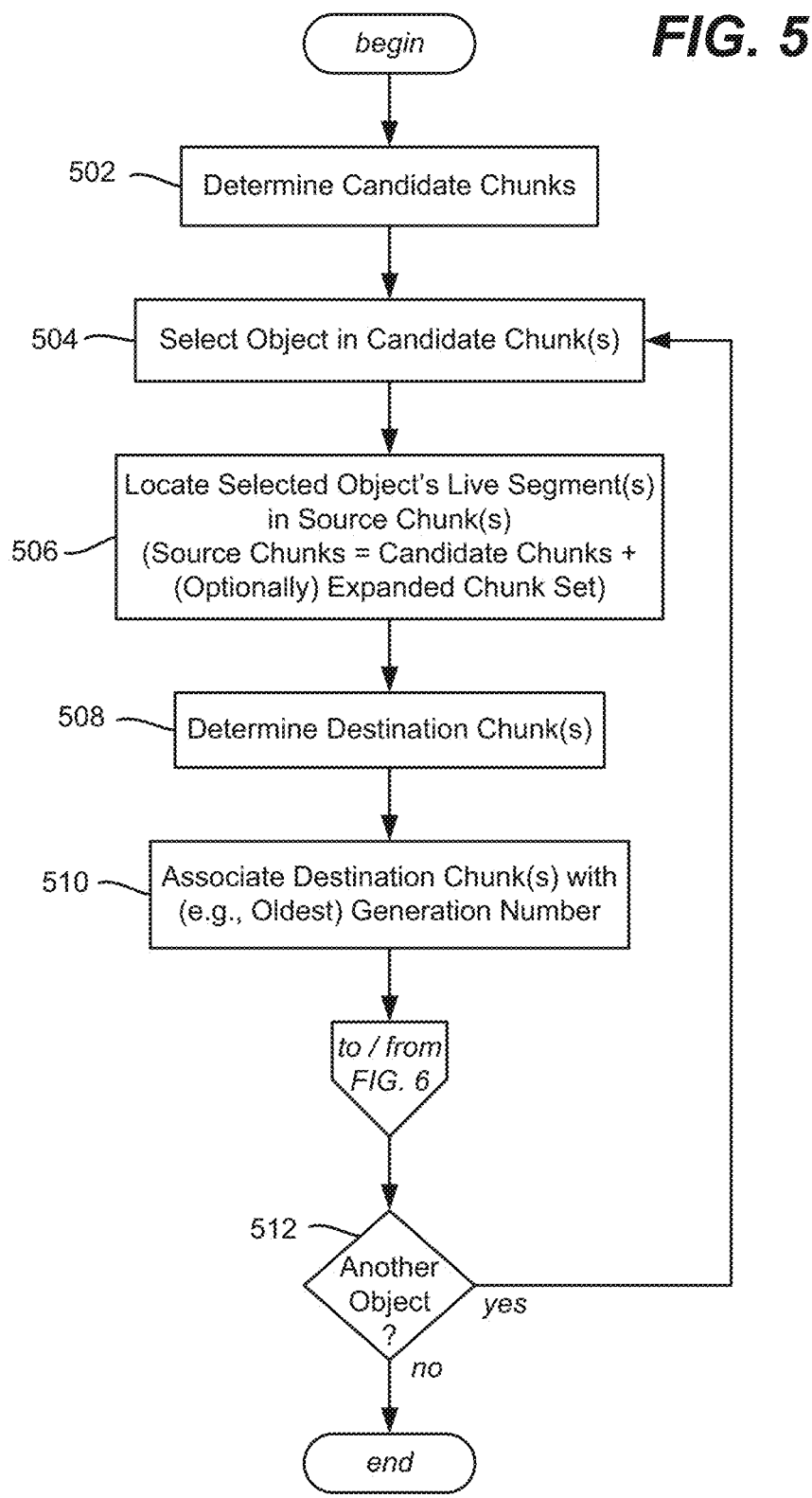
FIGS. 5 and 6 comprise a flow diagram representing example operations for consolidating garbage collection, according to one or more example implementations.
Figure 6:
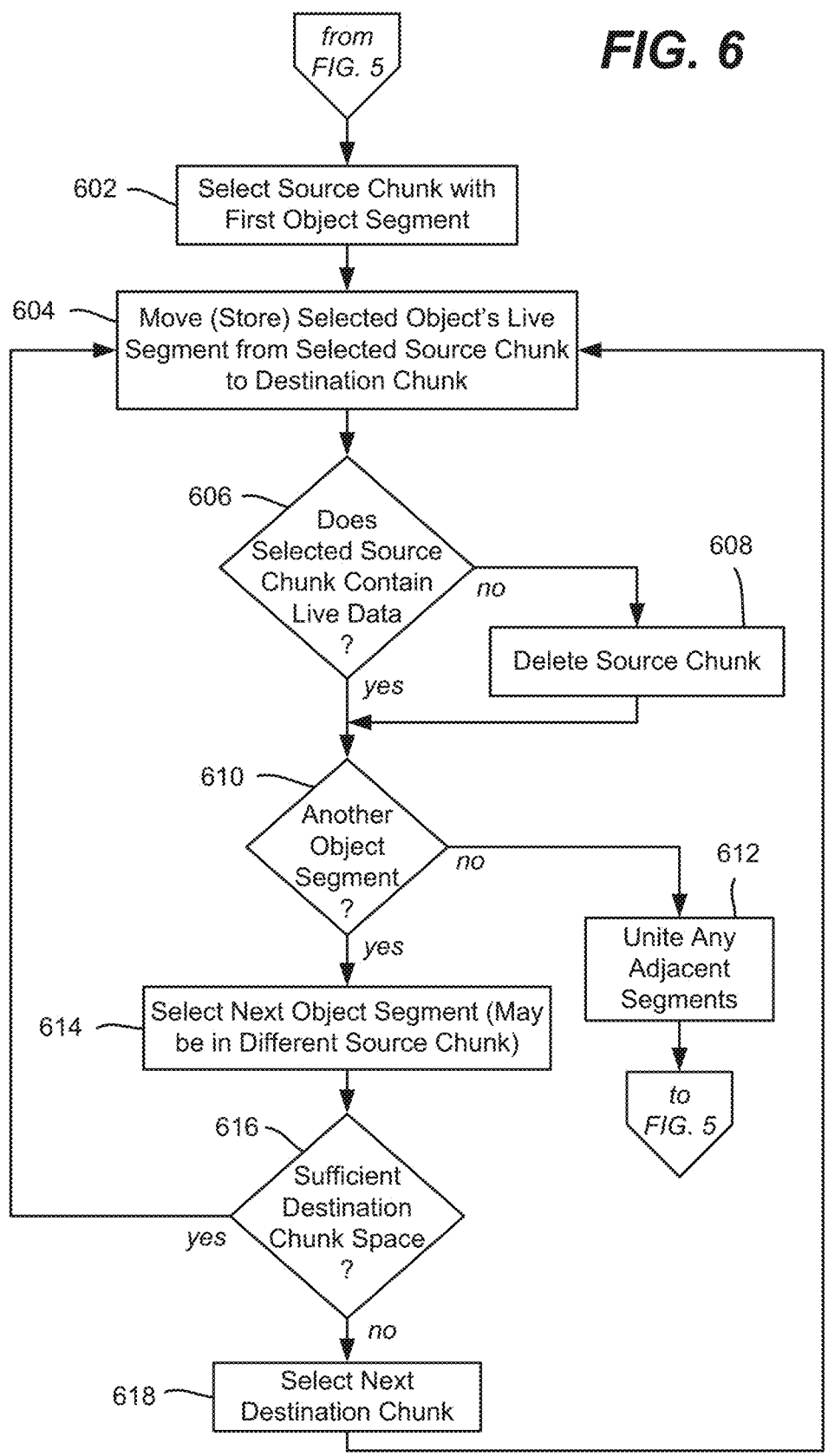

FIGS. 5 and 6 comprise a flow diagram of example operations related to consolidating garbage collection. As is understood, FIGS. 5 and 6 describe only one example process, and there are other ways to accomplish consolidating garbage collection. For example, a map from source chunks to destination chunks as described herein can be set up in advance of consolidating garbage collection, at least to an extent. Parallel operations can occur, at least to some extent, and so on.

Operation 502 represents determining the garbage collection candidate chunks, which can be performed by scanning the object table to determine which chunks are below a capacity utilization threshold value. Such garbage collection candidate chunks can be identified by a respective chunk number written into a data structure such as a list, for example.

Operation 504 represents selecting an object that is stored in the garbage collection candidate chunks, such as the first object stored in the first listed garbage collection candidate chunk. Operation 506 locates the live data segments of the object, e.g., by accessing the object table to determine which other chunk or chunks, if any, contains at least one data segment of the selected object. These are potential source chunks for copying the object.

Note that at this time, the potential source chunks for copying data can be any chunk that contains a data segment of the selected object, not necessarily only a chunk from the group of candidate chunks. Note that it is feasible to include all chunks that have an object's data segments in the set of source chunks for that object; this would ensure that an entire object having any part thereof in a garbage collection candidate chunks gets copied to a new destination object. Doing so however is not necessarily efficient, and thus expanding the set of source chunks in some limited way can be more efficient.

As set forth above, one way to expand the set of the source chunks is to include the garbage collection candidate chunks plus some limited number of other chunk(s), such as chunk(s) that are almost but not quite garbage collection candidate chunks. In the example above, such expanded source chunks are those with utilization below X (e.g., ninety) percent times the capacity utilization threshold value.

As another way to expand yet limit the set of source chunks for an object's data segments, it feasible to consider how many (or how large) of an object's data segments will be moved into a new chunk or chunks versus how many will not be moved. A threshold value such as a percentage can then be used to determine whether to include a source chunk or not based on the number. For example, consider that an object has ten live segments, nine of which (ninety percent) are in the original source chunks, with an eighty-five percent data segment copying threshold. Even if the remaining live segment is in a high capacity utilization chunk that would not ordinarily be considered a source chunk, the high capacity utilization chunk can be a source chunk for this remaining data segment, whereby the remaining data segment is copied from the high capacity utilization chunk so that the new chunk space contains the entire object.

Operation 508 represents determining one or more destination chunk for the data segments to be copied into, depending on the total size of the data segments. This allocation of a destination chunk or chunks can be done via a map as described above, or dynamically "streamed" as also described above.

Operation 510 associates a generation number with the destination chunk or chunks for the selected object. More particularly, consolidating garbage collection is compatible with the concept of generational garbage collection, and thus consolidating garbage collection can be combined with aspects of generational garbage collection. In generational garbage collection, each time a new destination chunk is created as part of the garbage collection process, the destination chunk is associated with a generation number, e.g. increased from the generation number used with the previous garbage collection cycle. In generational garbage collection, garbage collection candidate chunks are grouped together by generation number before copying their data segments to new chunks; in this way, over time the data segments generally tend to be grouped together into chunks by age, which helps to reduce further copying during the next garbage collection cycle.

With a combined generational and consolidating garbage collector, the data segments of one object may belong to chunks of different generations. Therefore, with generational copying only, the data segments of an object could (and often would) go to destination chunks of different generations. To avoid this scenario during consolidating garbage collection, one destination generation number can be chosen for the chunk or chunks of such objects (that is, the chunks to which an object's data segments are copied). In many cases it may be beneficial to choose the oldest generation number from among the potential destination generation numbers. The consolidating garbage collection process continues at operation 602 of FIG. 6.

Operation 602 represents selecting the source chunk that contains the first available (or first mapped or otherwise planned) object segment from among the source chunks. Operation 604 moves (stores a copy of the segment and marks the source space as unused) the selected object's live segment from the selected source chunk to the destination chunk. Note that as part of the data move, the object's system metadata, including location information in the object table is updated accordingly.

Operation 606 evaluates whether after the move the source chunk contains any remaining live data. If not, operation 608 deletes the source chunk. Note that deletion can, but need not, occur immediately; for example, chunks can be marked for deletion, with actual deletion performed by another process, e.g., generally in parallel or at a later time, and so on.

Operation 610 is performed to determine whether another data segment is available for the selected object. If not, operation 612 is (optionally) performed to unite any adjacent data segments for the selected object, which can be in the current destination chunk in use as well as in any prior destination chunk used during consolidation of this selected object. Note that an alternative is to unite two adjacent chunks after as a next chunk is stored (e.g., following operation 604). In the example of FIGS. 5 and 6, the consolidating garbage collection process returns to FIG. 5, operation 512, to repeat for the next object until no objects in the source chunks remain.

If there still at least one data segment of the object to be moved, operation 610 branches to operation 614 which selects the next available object segment. Note that this next selected object segment may be in a different source chunk.

Operation 616 evaluates whether the destination object has sufficient remaining space with respect to the selected object's next data segment. If so, the process returns to operation 604, otherwise operation 618 is performed to select a next destination chunk before returning to operation 604. Note that although not explicitly shown in FIGS. 5 and 6, the previous destination chunk can be sealed with respect to further writes, or left open for another object's data, such as based on a capacity utilization threshold evaluation as described herein.

It should be noted that the object's data segments can be pre-planned/mapped (e.g., in advance for multiple source and destination chunks or dynamically/per-object) to better fit a destination chunk or group of destination chunks. Thus, for example, if an object has seven data segments, the data segments may better fit into two destination chunks if segments 1, 4, 5 and 6 are moved into a first destination chunk and segments 2, 3 and 7 are moved into a second destination chunk. Thus, although changing the segment order will lower the number of segments that can be united, storage space can be more efficiently used in such an alternative implementation.

It is also a feasible alternative to break up a data segment to fit the remaining space of the destination chunk; however, doing so would add metadata. Notwithstanding, if the selected data segment is adjacent the previous data segment in the chunk, breaking up the data segment into two parts and then uniting the first part with the adjacent part in the destination chunk would reduce object metadata, while storing the second part of the broken up data segment in a next destination chunk would increase the object metadata; thus such a metadata tradeoff can be a viable option.

Figure 7:
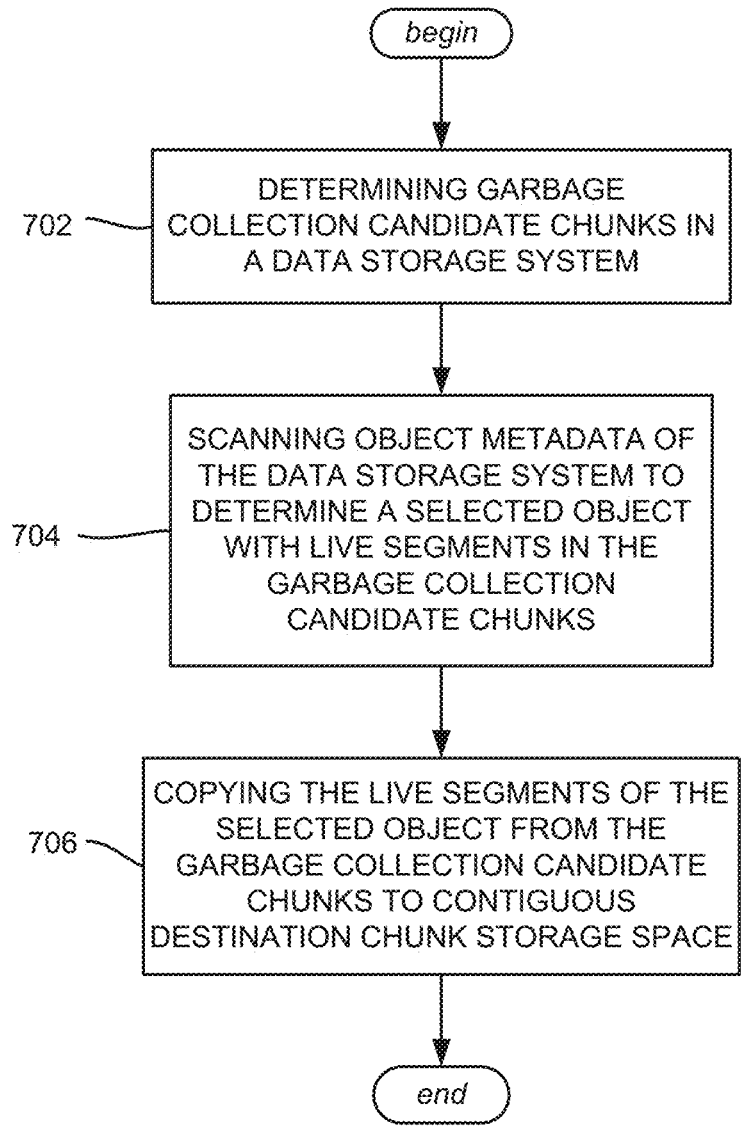
FIG. 7 is a flow diagram showing example operations related to copying segments of a selected object to destination storage space, according to one or more example implementations.

One or more aspects are represented in FIG. 7, such as of a system comprising a processor, and a memory that stores executable instructions that, when executed by the processor, facilitate performance of operations. Operation 702 represents determining garbage collection candidate chunks in a data storage system. Operation 704 represents scanning object metadata of the data storage system to determine a selected object with live segments in the garbage collection candidate chunks. Operation 706 represents copying the live segments of the selected object from the garbage collection candidate chunks to contiguous destination chunk storage space.

Further operations can comprise garbage collecting a garbage collection candidate chunk in response to no live segment of the garbage collection candidate chunk remains being determined to be uncopied.

The contiguous destination chunk storage space can comprise storage space of a single chunk. The contiguous destination chunk storage space can comprise storage space of a sequence of two or more chunks, wherein at least one chunk of the sequence of two or more chunks comprises contiguous storage space.

Further operations can comprise determining one or more expanded source chunks that maintain one or more live segments of the selected object, and copying the one or more live segments of the selected object from the expanded source chunks to the contiguous destination chunk storage space.

Further operations can comprise detecting adjacent live segments of the object in the contiguous destination chunk storage space, and modifying object metadata of the adjacent live segments to unite the adjacent live segments into a combined segment in the contiguous destination chunk storage space.

A first one of the live segments can correspond to a first chunk associated with a first generation number, a second one of the live segments can correspond to a second chunk associated with a second generation number that is different from the first generation number, and further operations can comprise selecting the first generation number, and associating the first generation number with the contiguous chunk storage space. Selecting the first generation number can comprise determining that the first generation number represents an older generation than a generation represented by the second generation number.

Figure 8:
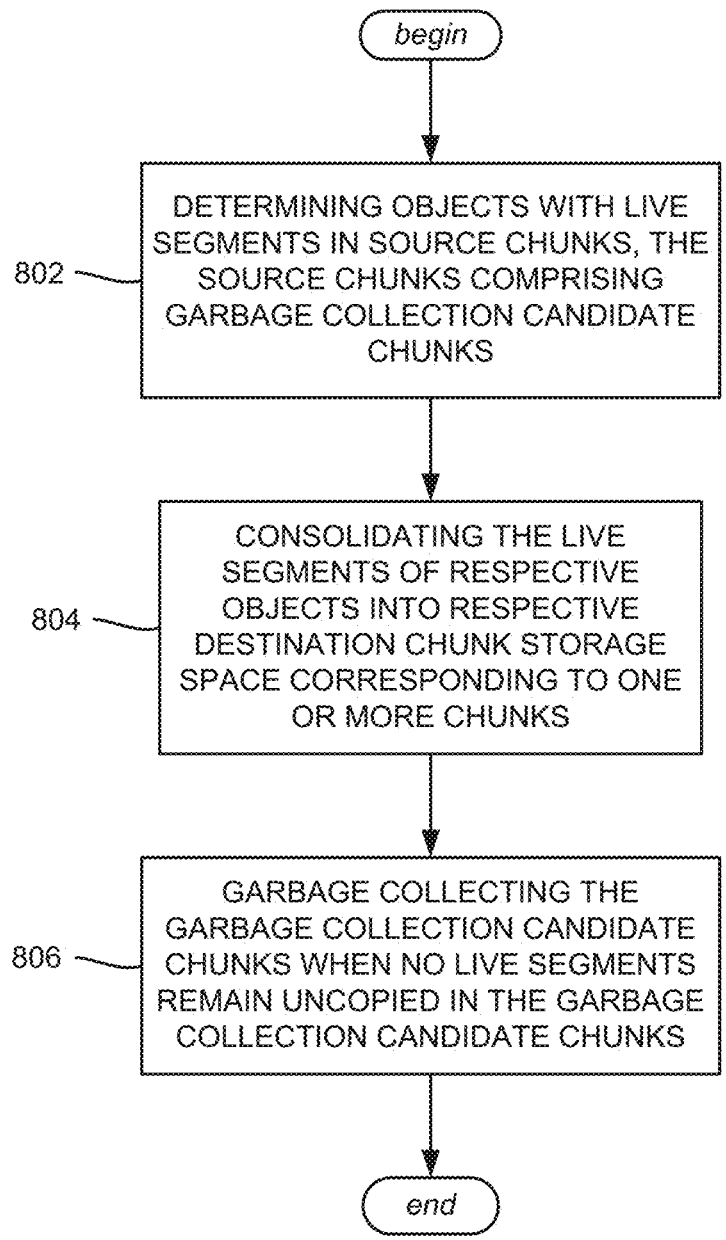
FIG. 8 is a flow diagram showing example operations related to consolidating garbage collection, including by copying data segments of respective objects to respective destination chunks, according to one or more example implementations.

One or more aspects are represented in FIG. 8, such as example operations of a method. Operation 802 represents determining, by a system comprising a processor, objects with live segments in source chunks, the source chunks comprising garbage collection candidate chunks. Operation 804 represents consolidating the live segments of respective objects into respective destination chunk storage space corresponding to one or more chunks. Operation 806 represents garbage collecting the garbage collection candidate chunks when no live segments remain uncopied in the garbage collection candidate chunks.

Determining the objects with live segments in the source chunks can comprise locating one or more expanded chunks that contain live segments.

Consolidating the live segments of the respective objects into the respective destination chunk storage space can comprise accessing metadata of an object to determine segments of the live segments of the object, determining that the segments of the live segments of the object will fit into a single chunk's space, and copying the segments of the live segments of the object to a single chunk. Consolidating the live segments of the respective objects into the respective destination chunk storage space can comprise accessing metadata of an object to determine segments of the live segments of the object, determining that the segments of the live segments of the object will not fit into a single chunk's space, and copying the segments of the live segments of the object to two or more chunks.

Aspects can comprise detecting adjacent live segments of an object in the destination chunk storage space, and modifying object metadata of the adjacent live segments to unite the adjacent live segments into a combined segment in the destination chunk storage space.

A first live segment of an object can correspond to a first chunk associated with a first generation number, a second live segment of the object can correspond to a second chunk associated with a second generation number that is older than the first generation number, and aspects can comprise associating the second generation number with the destination chunk storage space.

Figure 9:
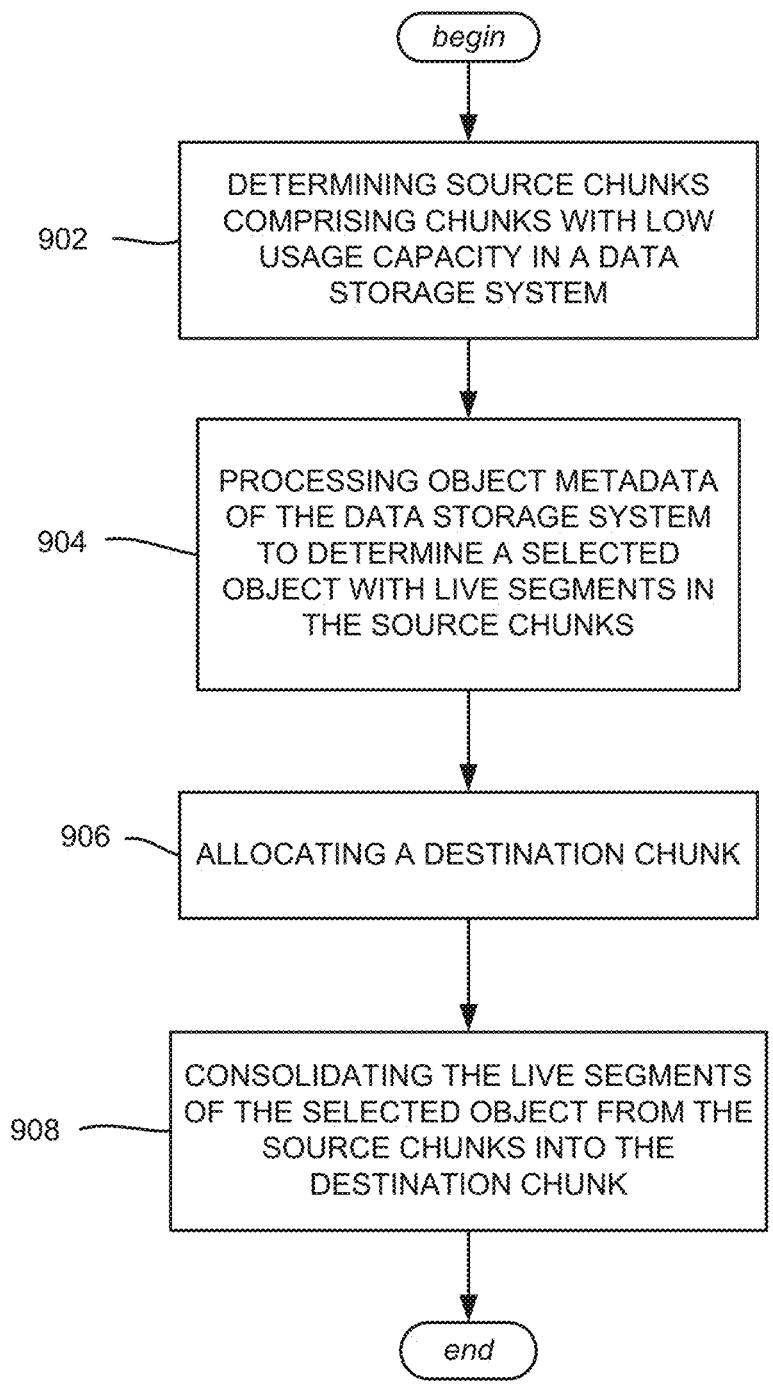
FIG. 9 is a flow diagram showing example operations related to consolidating live segments of an object into an allocated destination chunk, according to one or more example implementations.

One or more aspects, such as implemented in a machine-readable storage medium, comprising executable instructions that, when executed by a processor of a first node device of a cluster of node devices, facilitate performance of operations, can be directed towards operations exemplified in FIG. 9. Example operation 902 represents determining source chunks comprising chunks with low usage capacity in a data storage system. Example operation 904 represents processing object metadata of the data storage system to determine a selected object with live segments in the source chunks. Example operation 906 represents allocating a destination chunk. Example operation 908 represents consolidating the live segments of the selected object from the source chunks into the destination chunk.

Further operations can comprise determining that a source chunk that contained a live segment of the object before the consolidating has no live segments of an object remaining therein after the consolidating, and, in response to the determining, garbage collecting the source chunk.

The selected object with the live segments in the source chunks can comprise a first selected object, and further operations can comprise processing the object metadata of the data storage system to determine a second selected object with live segments in the source chunks, and consolidating the live segments of the second selected object from the source chunks into the destination chunk.

Further operations can comprise detecting adjacent live segments of the object in the destination chunk, and modifying the object metadata of the adjacent to unite the adjacent live segments into a combined segment in the destination chunk.

A first live segment of an object can correspond to a first source chunk associated with a first generation number, wherein a second live segment of the object can correspond to a second source chunk associated with a second generation number that is older than the first generation number, and further operations can comprise associating the second generation number with the destination chunk.

Determining the source chunks can comprise scanning the object table to determine low-capacity utilization chunks and to determine an expanded chunk set comprising at least one chunk that contains at least one live segment of the selected object.

As can be seen, described herein is a technology that facilitates efficient garbage collection by copying data segments of an object into new chunk(s) as part of deleting old underutilized chunks. As exemplified herein, the consolidating garbage collection technology reduces the number of garbage collection cycles relative to the number of prior system (e.g., copying/generational) garbage collection cycles. The technology is practical to implement and reclaims storage capacity with less workload than other techniques.

Figure 10:
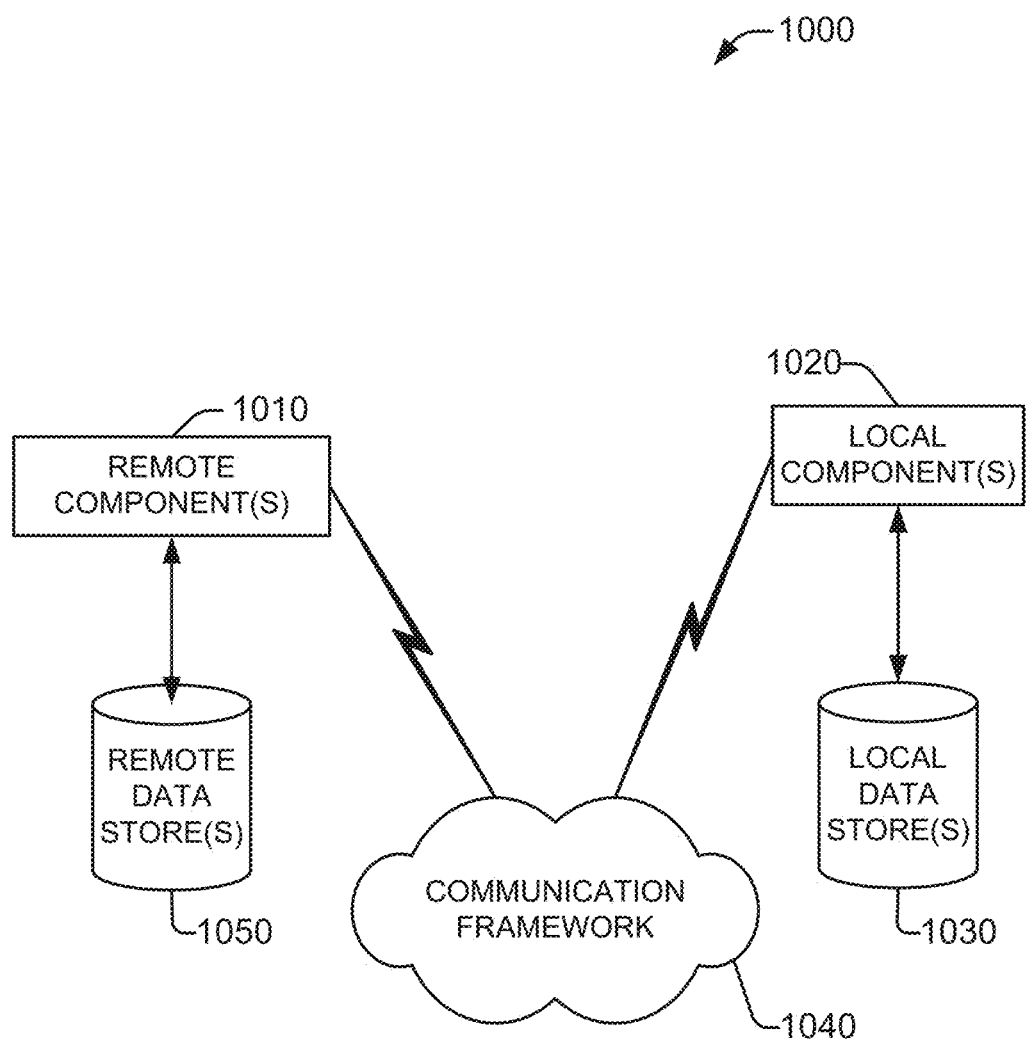
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
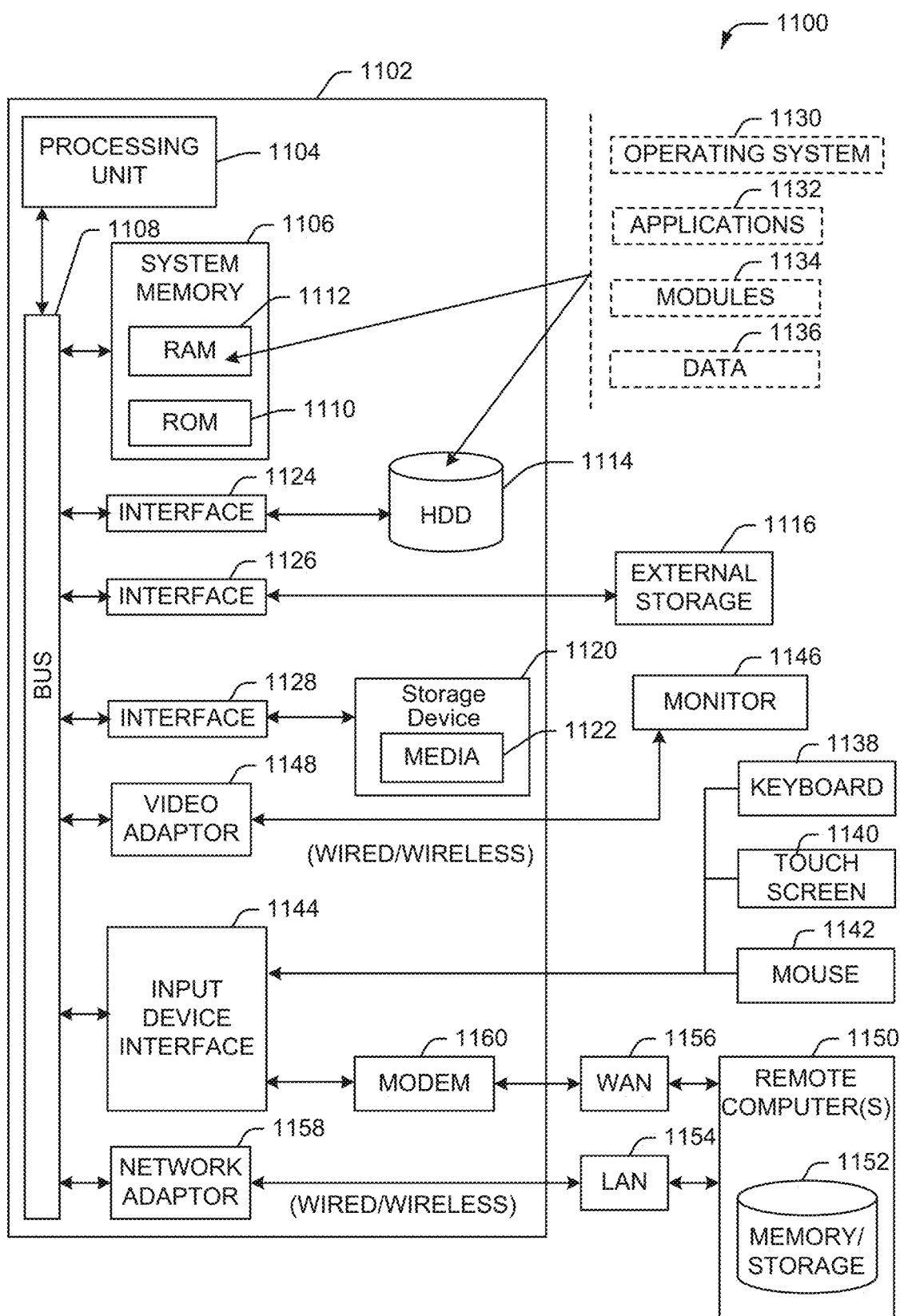
FIG. 11 illustrates an example block diagram of a computing system operable to execute the disclosed systems and methods in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor, and
a memory that stores executable instructions that, when executed by the processor, facilitate performance of operations, the operations comprising:
determining garbage collection candidate chunks in a data storage system;
scanning object metadata of the data storage system to determine a selected object with live segments in the garbage collection candidate chunks;
copying the live segments of the selected object from the garbage collection candidate chunks to contiguous destination chunk storage space;
detecting adjacent live segments of the selected object in the contiguous destination chunk storage space; and
modifying object metadata of the adjacent live segments to unite the adjacent live segments into a combined segment in the contiguous destination chunk storage space.

2. The system of claim 1, wherein the operations further comprise garbage collecting a garbage collection candidate chunk in response to no live segment of the garbage collection candidate chunk remains being determined to be uncopied.

3. The system of claim 1, wherein the contiguous destination chunk storage space comprises storage space of a single chunk.

4. The system of claim 1, wherein the contiguous destination chunk storage space comprises storage space of a sequence of two or more chunks, wherein at least one chunk of the sequence of two or more chunks comprises contiguous storage space.

5. The system of claim 1, wherein the operations further comprise determining one or more expanded source chunks that maintain one or more live segments of the selected object, and copying the one or more live segments of the selected object from the one or more expanded source chunks to the contiguous destination chunk storage space.

6. The system of claim 1, wherein a first one of the live segments corresponds to a first chunk associated with a first generation number, wherein a second one of the live segments corresponds to a second chunk associated with a second generation number that is different from the first generation number, and wherein the operations further comprise selecting the first generation number, and associating the first generation number with the contiguous destination chunk storage space.

7. The system of claim 6, wherein the selecting the first generation number comprises determining that the first generation number represents an older generation than a generation represented by the second generation number.

8. The system of claim 1, wherein the scanning object metadata of the data storage system to determine the selected object with the live segments comprises locating one or more expanded chunks that contain the live segments.

9. A method comprising:
determining, by a system comprising a processor, respective objects with live segments in source chunks, the source chunks comprising garbage collection candidate chunks;
consolidating the live segments of the respective objects into respective destination chunk storage space corresponding to one or more chunks, wherein the consolidating comprises:
accessing metadata of an object of the respective objects to determine segments of the live segments of the object, and
in response to determining that the segments of the live segments of the object are unable to fit into a space of a single chunk, copying the segments of the live segments of the object to two or more chunks; and
garbage collecting the garbage collection candidate chunks when no live segments remain uncopied in the garbage collection candidate chunks.

10. The method of claim 9, wherein the determining the respective objects with the live segments in the source chunks comprises locating one or more expanded chunks that contain the live segments.

11. The method of claim 9, wherein the consolidating the live segments of the respective objects into the respective destination chunk storage space further comprises in response to determining that the segments of the live segments of the object are able to fit into the space of the single chunk, copying the segments of the live segments of the object to the single chunk.

12. The method of claim 9, further comprising detecting adjacent live segments of another object in the destination chunk storage space, and modifying object metadata of the adjacent live segments to unite the adjacent live segments into a combined segment in the destination chunk storage space.

13. The method of claim 9, wherein a first live segment of the object corresponds to a first chunk associated with a first generation number, wherein a second live segment of the object corresponds to a second chunk associated with a second generation number that is older than the first generation number, and wherein the method further comprises associating the second generation number with the destination chunk storage space.

14. The method claim 9, wherein a destination chunk storage space of the respective destination chunk storage space comprises storage space of the single chunk.

15. A non-transitory machine-readable medium, comprising executable instructions that, when executed by a processor, facilitate performance of operations, the operations comprising:
determining source chunks comprising chunks with low usage capacity in a data storage system, wherein the determining the source chunks comprising chunks with the low usage capacity comprises scanning an object table to determine low-capacity utilization chunks and to determine an expanded chunk set comprising at least one chunk that contains at least one live segment of a selected object;
processing object metadata of the data storage system to determine the selected object with live segments in the source chunks;

allocating a destination chunk; and
consolidating the live segments of the selected object from the source chunks into the destination chunk.

16. The non-transitory machine-readable medium of claim 15, wherein the operations further comprise determining that a source chunk that contained a live segment of the object before the consolidating has no live segments of an object remaining therein after the consolidating, and, in response to the determining, garbage collecting the source chunk.

17. The non-transitory machine-readable medium of claim 15, wherein the selected object with the live segments in the source chunks comprises a first selected object, and wherein the operations further comprise processing the object metadata of the data storage system to determine a second selected object with live segments in the source chunks, and consolidating the live segments of the second selected object from the source chunks into the destination chunk.

18. The non-transitory machine-readable medium of claim 15, wherein the operations further comprise detecting adjacent live segments of the object in the destination chunk, and modifying the object metadata of the adjacent to unite the adjacent live segments into a combined segment in the destination chunk.

19. The non-transitory machine-readable medium of claim 15, wherein a first live segment of an object corresponds to a first source chunk associated with a first generation number, wherein a second live segment of the object corresponds to a second source chunk associated with a second generation number that is older than the first generation number, and wherein the operations further comprise, associating the second generation number with the destination chunk.

20. The non-transitory machine-readable medium of claim 15, wherein the processing object metadata of the data storage system to determine the selected object with the live segments in the source chunks comprises locating one or more expanded chunks that contain the live segments.

* * * * *